United States Patent
Triola et al.

[19]

[11] Patent Number: 6,073,539
[45] Date of Patent: Jun. 13, 2000

[54] COMBINATION BOTTLED WATER AND COFFEE DISPENSER

[76] Inventors: Gary V. Triola, 64242 Hwy. 41, Pearl River, La. 70452; Paul J. Gremillion, 210 Elmwood St., Slidell, La. 70460; Michael Bradley Penton, 82 Sealcrest Dr., Picayune, Miss. 39466

[21] Appl. No.: 09/039,357

[22] Filed: Mar. 13, 1998

Related U.S. Application Data

[60] Provisional application No. 60/036,238, Mar. 14, 1997.

[51] Int. Cl.[7] ........................................... A47J 31/00
[52] U.S. Cl. ......................... 99/290; 99/275; 99/323.3; 222/146.1
[58] Field of Search ............................. 99/290, 275, 279, 99/323.3; 222/146.1, 146.2, 146.6

[56] References Cited

U.S. PATENT DOCUMENTS

| | | | |
|---|---|---|---|
| 3,641,918 | 2/1972 | Schellgell et al. | 99/279 |
| 4,470,999 | 9/1984 | Carpiac | 99/275 X |
| 4,603,620 | 8/1986 | Daugherty | 99/290 X |
| 4,655,123 | 4/1987 | Schrader | 99/279 |
| 4,825,758 | 5/1989 | Snowball et al. | 99/282 |
| 5,225,076 | 7/1993 | Meredith | 210/187 |
| 5,285,718 | 2/1994 | Webster et al. | 99/290 |

*Primary Examiner*—Reginald L. Alexander
*Attorney, Agent, or Firm*—Kenneth L. Tolar

[57] ABSTRACT

The present invention relates to a bottled water dispenser capable of instantly producing and delivering a desired amount of coffee produced by mixing liquid coffee concentrate and bottled water. The device includes a pump for delivering coffee concentrate from a storage reservoir received within the dispenser housing to a mixing chamber. The dispenser further includes a hot water system in selective communication with the mixing chamber using a solenoid. The solenoid and pump are activated with a pair of buttons on the housing exterior. A child safety switch is electrically connected to the buttons which, when activated, requires that both buttons be simultaneously depressed to activate the pump and solenoid. When the switch is disabled, only one button must be depressed. Accordingly, a user may instantly dispense a desired amount of coffee produced from bottled water by pressing a button.

9 Claims, 3 Drawing Sheets

COMBINATION BOTTLED WATER AND COFFEE DISPENSER

This application is entitled to priority from a provisional application bearing Ser. No. 60/036,238 filed on Mar. 14, 1997 entitled "An Apparatus For Retrofitting A Water Dispenser To Deliver Liquid Coffee Concentrate."

BACKGROUND OF THE INVENTION

The present invention generally relates to an improvement to an existing bottled water dispenser to allow the dispenser to instantly produce and deliver a desired amount of hot coffee.

DESCRIPTION OF THE PRIOR ART

Coffee is typically brewed in the home or office using a standard automatic drip coffee maker. For each batch of coffee produced, a predetermined amount of coffee is placed into a brewing chamber. Water is heated and delivered from a storage reservoir to the brewing chamber to produce coffee which then drips into a pot. The amount of coffee that a given coffee maker can produce is typically limited to about twelve cups. After each pot is consumed, the coffee maker is typically rinsed and the process is repeated which is laborious and inconvenient. Also, the user must wait for about five to ten minutes after the brewing cycle has begun before being able to actually pour a cup of coffee. The practice of making coffee in a standard coffee maker is even more time consuming in larger volume applications such as in an office or other similar public places due to the limited capability of the coffee maker.

Although larger restaurant grade coffee makers exist which minimize the problem described above, these devices must eventually be cleaned and reloaded which is burdensome. In addition, coffee drinkers often prefer coffee produced with bottled water since it typically tastes better than coffee brewed with chlorinated tap water. However, with each quantity of coffee brewed, a user must manually refill the coffee maker with bottled water from a dispenser or bottle which is cumbersome and inconvenient. Accordingly, there is currently a need for a device that allows a user to have instant access to a desired amount of hot coffee produced from bottled water without having to continuously reload a coffee maker with coffee or bottled water. Although various coffee dispensers and devices for delivering bottled water to a coffee maker exist in the prior art, none of these devices relate to a bottled water dispenser having an integral coffee producing and dispensing means therein. For example, U.S. Pat. No. 5,285,718 issued to Webster generally relates to a large, restaurant style coffee maker having separate hot and cold water reservoirs. Hot water may be delivered from the hot water reservoir to a spray head which disperses the water about a basket of coffee grounds; or, alternatively hot water may be delivered directly to a faucet. The cold water tank contains a cooling rod and cooling module for chilling water stored therein allowing a user to have instant access to chilled water for drinking or other uses.

U.S. Pat. No. 4,655,123 issued to Shrader discloses an apparatus for delivering bottled water to a coffee maker. The invention is designed to deliver a predetermined amount of water to a commercial type coffee maker. The device includes a pump in communication with a bottle of water intermittently operable with a timer allowing desired amounts of the water to be delivered to the coffee maker. The apparatus is designed to eliminate the task of manually refilling coffee makers with bottled water.

U.S. Pat. No. 5,225,076 issued to Meredith discloses a purified coffee and ice water dispenser which replaces the standard kitchen sink taps. Water may be directed through a filter and into a hot water reservoir where it is heated. The hot water may be dispensed directly or it may be routed to a coffee drawer for producing coffee. Alternatively, water may be directed from the faucet to a filter then to a second storage reservoir where it is chilled. Water may also be directed through a spout and into the sink.

U.S. Pat. No. 4,825,758 issued to Snowballs et al discloses a coffee and/or tea dispenser that meters the volume of coffee delivered so that consistent quantities are dispensed regardless of the coffee level in the coffee holding tank. The device is designed primarily for coin operated applications.

None of the above described devices relate to a dispensing system which allows a user to selectively produce and dispense a desired amount of coffee directly from a bottled water dispenser. The present invention provides such an assembly, and moreover, provides a child safety switch to prevent small children from inadvertently dispensing hot coffee.

SUMMARY OF THE INVENTION

The present invention relates to a water dispenser of the type generally known in the prior art comprising a rectangular housing having an open top on which a bottle of water is placed. On a side of the housing are hot and cold water dispensing spouts. The present invention allows the water dispenser to instantly produce and deliver piping hot coffee and includes a container of shelf stable liquid coffee concentrate stored within the dispenser housing. A tube is received within the container and is connected to the suction side of a pump. A discharge tube is routed from the pump to a mixing tube which is also in selective communication with the hot water line using a solenoid. The mixing tube is routed to a coffee dispensing spout which is mounted to a side of the water dispenser housing preferably between the hot and cold water spouts.

A pair of buttons are also mounted on a side of the housing for selectively activating the pump and solenoid. The operation of the buttons depends upon whether a child safety switch is activated. If the switch is activated, both buttons must be depressed simultaneously in order to activate the coffee system. If the child switch is deactivated, then only one button must be depressed to activate the system. It is therefore an object of the present invention to provide a coffee maker and dispenser integral with a bottled water dispenser.

It is yet another object of the present invention to provide a coffee dispenser which may instantly deliver a predetermined amount of coffee using bottled water.

It is yet another object of the present invention to provide a coffee dispenser which instantly delivers a desired amount of piping hot coffee without brewing or intermittently refilling a coffee maker. Other objects, features and advantages of the present invention will become readily apparent from the following detailed description of the preferred embodiment when considered with the attached drawings and the appended claims.

DESCRIPTION OF THE PREFERRED EMBODIMENT

Figure 2:
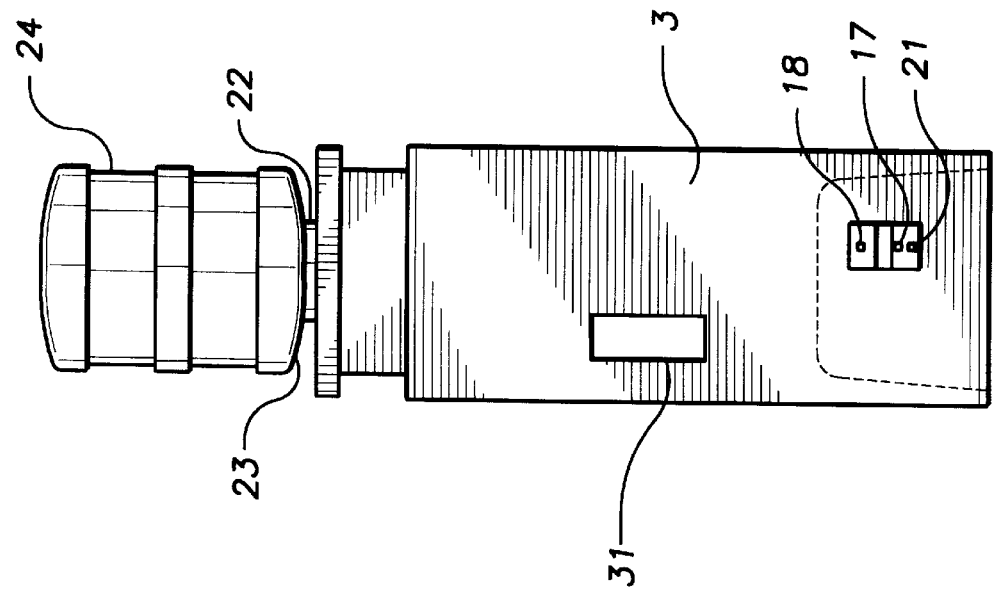
FIG. 2 is a rear view of a bottled water dispenser according to the present invention.
Figure 1:
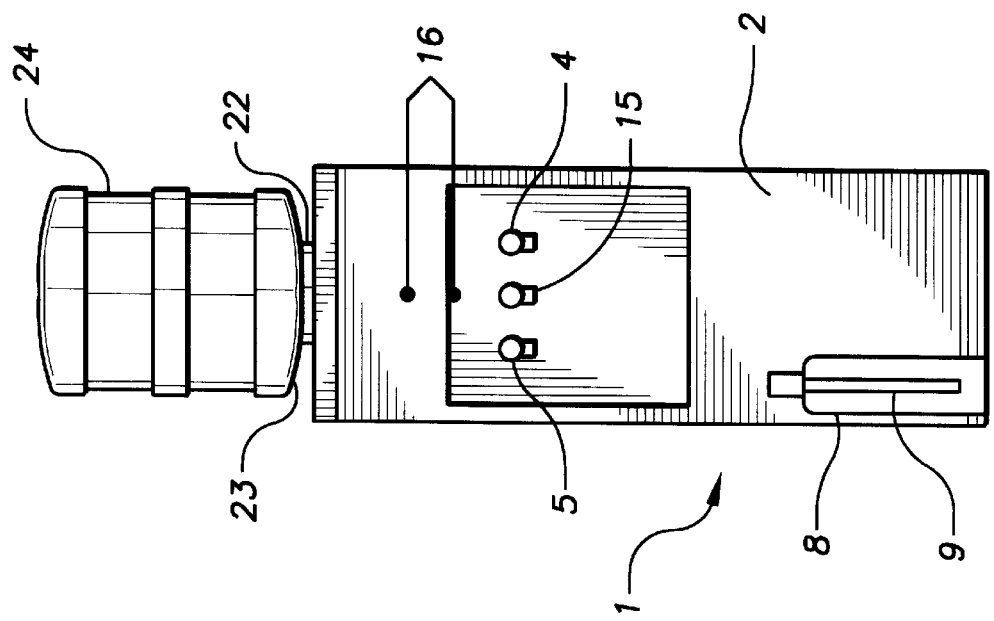
FIG. 1 is a front view of a bottled water dispenser according to the present invention.
Figure 3:
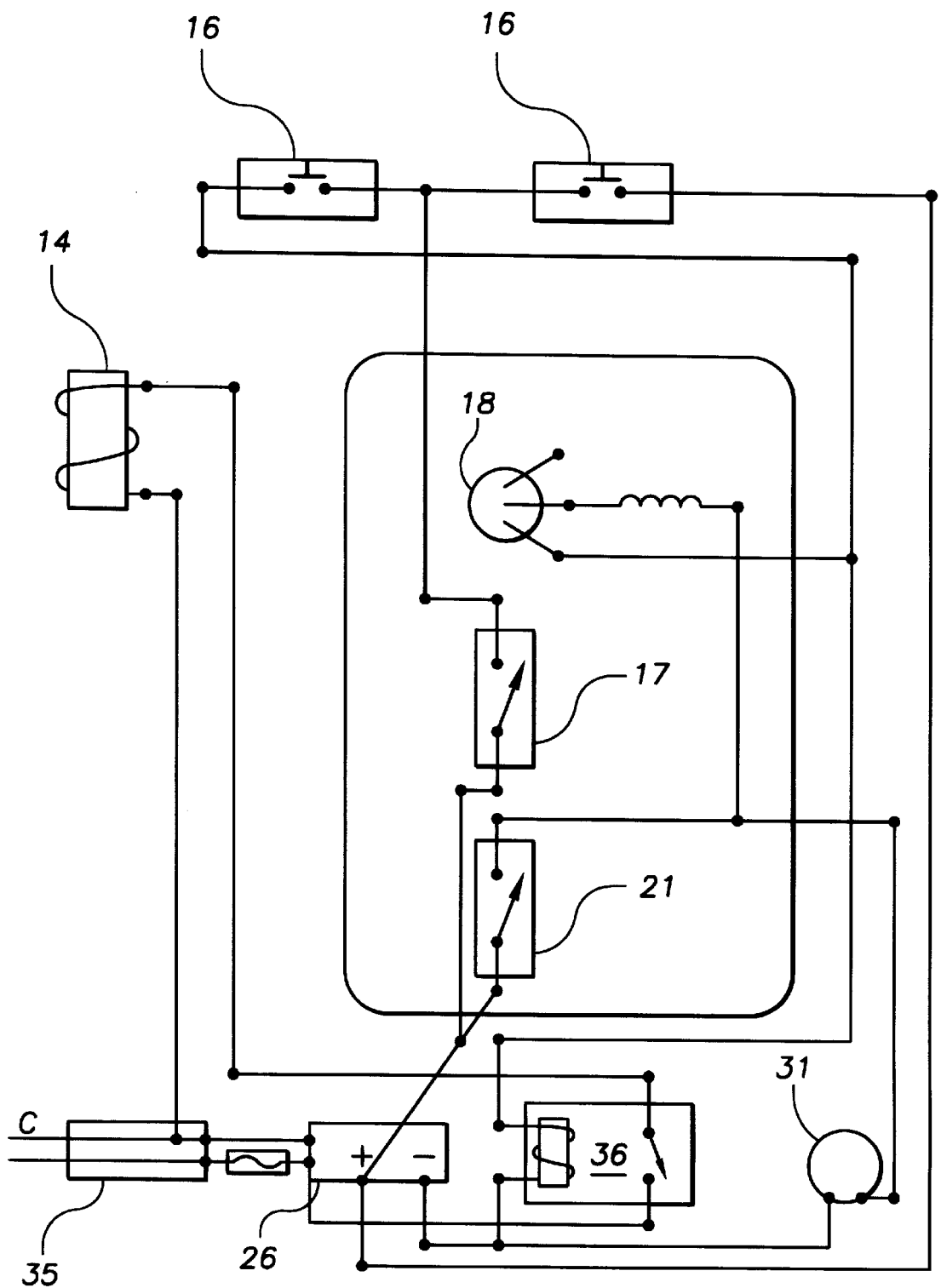
FIG. 3 is a schematic of the various electrical components according to the present invention.
Figure 4:
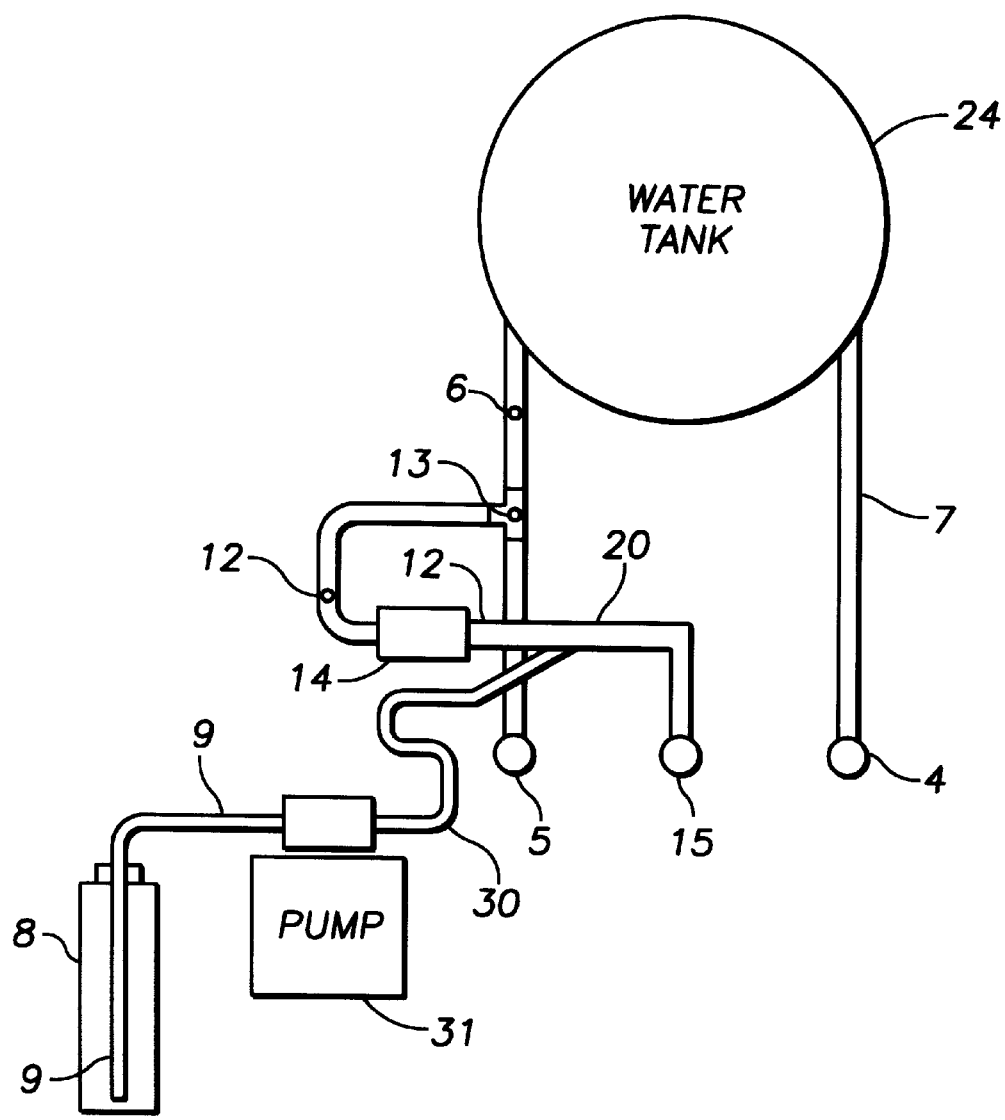
FIG. 4 is a schematic of the various internal components comprising the present invention.

Referring now to FIGS. 1 through 3, the present invention relates to a bottled water dispenser of the type generally known in the prior art comprising a vertically oriented, substantially hollow housing 1 having a substantially rectangular cross sectional configuration. The housing has front 2 and rear 3 walls with two side walls perpendicularly disposed therebetween. The housing 1 also has an open, substantially circular top 22 for receiving the neck 23 portion of a water bottle 24.

Either hot or cold water may be delivered with a pair of dispensing spouts 4,5 mounted on the front wall 2 of the housing. The cold water dispensing spout 4 is in communication with a cold water supply line 7 and a water cooling assembly of the type generally known in the prior art. Likewise, the hot water dispensing spout 5 is in communication with a hot water supply line 6 and a heating mechanism of the type generally known in the prior art.

The present invention relates to the above described conventional water dispenser allowing the dispenser to selectively deliver coffee produced from a liquid coffee concentrate. The device comprises a substantially cylindrical liquid coffee concentrate storage reservoir 8 received within the housing. The liquid coffee concentrate received therein is of the type referred to as shelf stable liquid coffee concentrate or may relate to any other similar formulation which instantly produces coffee when mixed with hot water. A coffee supply tube 9 extends from the reservoir to a pump 31 such as a peristaltic pump, or similar pump means. A second tube 30 extends from the pump discharge to a mixing chamber, preferably a tube 20.

A hot water bypass line 12 is connected with the standard hot water supply line 6 using a "T" connector 13 or similar device. The bypass line 12 is in selective communication with the mixing tube 20 via a solenoid 14. The pump 31 and solenoid 14 deliver selectively variable amounts of coffee concentrate and hot water to the mixing tube to produce coffee therein. The mixing tube 20 effluent is routed to a third spout 15 preferably disposed between the hot and cold water spouts for instantly delivering a desired amount of coffee therethrough.

The pump and solenoid are activated with a pair of buttons 16 disposed on the front wall of the housing preferably above the water and coffee delivery spouts. The buttons 16 are in communication with a child safety switch 17 that is operable between an on and an off position. The child safety switch 17 is preferably disposed on an electrical box (not pictured) mounted on a panel within the housing interior. The interiorly disposed panel is accessible with a hinged panel near the bottom of the housing on a side thereof.

A first button is depressed to activate the pump and solenoid when the child safety switch is in the off position. When the child safety switch is in an on position, both buttons must be simultaneously depressed in order to activate the coffee delivery system. An electrical schematic illustrating the interrelation of the buttons and child safety switch are depicted in FIG. 3.

The device further includes a potentiometer switch 18 for controlling the pump motor speed to vary the amount of liquid coffee concentrate delivered to the mixing tube depending upon the desired amount and concentration of the coffee to be dispensed. The potentiometer 18 is preferably disposed on the electrical box adjacent the child safety switch. A power source, preferably a transformer 26, for powering the various components is also provided as well as a terminal board 35 and a relay 36. A second switch means 21 is disposed on the electrical box and is in communication with the power source and pump which, when activated, causes power to bypass the potentiometer allowing the pump to run at maximum speed for priming and flushing the system.

The above described device is not to be limited to the exact details described above. The shape, size and materials of construction of the various components may be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. In combination with a water dispenser having a substantially hollow housing with vertical front and back walls and two vertical side walls perpendicularly disposed therebetween, a cold water spout on said front wall in communication with a cold water supply line and a cooling means and a hot water spout adjacent said cold water spout in communication with a hot water supply line and a heating means, a coffee dispensing system comprising:

a storage reservoir received within said housing for storing a predetermined amount of liquid coffee concentrate;

a mixing chamber;

means for delivering a predetermined amount of hot water from said hot water line to said mixing chamber;

means for delivering a selectively variable amount of liquid coffee concentrate from said storage reservoir to said mixing chamber to mix with said hot water to produce a desired amount of coffee therein;

a dispensing means on the front wall of said housing in communication with said mixing chamber for dispensing the desired amount of coffee therefrom.

2. A coffee dispenser according to claim 1 wherein said means for delivering liquid coffee from said storage reservoir to said mixing chamber comprises a variable speed pump in communication with said storage reservoir and said mixing chamber.

3. A coffee dispenser according to claim 1 further comprising a plurality of activation means on said front wall for selectively activating said coffee delivery means and said hot water delivery means.

4. A coffee dispenser according to claim 3 further comprising a safety switch in communication with each of said activation means for selectively disabling one of said activation means.

5. A coffee dispenser according to claim 4 wherein said activation means comprises a pair of buttons on the front wall of said housing in electrical communication with said safety switch, one of which must be depressed to activate said coffee and hot water delivery means when said switch is disabled, both of which must be simultaneously depressed to activate said coffee and hot water delivery means when said switch is activated.

6. A coffee dispenser according to claim 3 wherein said means for delivering a predetermined amount of hot water to said mixing chamber comprises:

a bypass line attached to said hot water supply line;

a solenoid disposed between said bypass line and said mixing chamber, said solenoid electrically connected to said activation means.

7. A coffee dispenser according to claim 2 further comprising a control means for selectively adjusting the speed of said pump.

8. A coffee dispenser according to claim 7 further comprising a bypass switch means for disabling power to said control means to selectively operate said pump at a maximum speed.

9. A coffee dispenser according to claim 7 wherein said control means comprises a potentiometer electrically connected to said pump.

* * * * *